Patented July 18, 1950

2,516,047

UNITED STATES PATENT OFFICE 2,516,047

STABLE CURABLE POLYORGANOSILOXANE COMPOSITIONS

John B. De Coste, Basking Ridge, N. J., assignor to Bell Telephone Laboratories, Incorporated, New York, N. Y., a corporation of New York No Drawing. Application November 15, 1945, Serial No. 628,981

5 Claims. (Cl. 260—46.5)

This invention relates to heat curable polymeric silicone compositions. More particularly it relates to such silicone compositions containing catalysts capable of accelerating their cure and to silicone compositions containing substances capable of stabilizing them against further polymerization at ordinary temperatures while not substantially interfering with their rate of cure at elevated temperatures.

The polymeric silicones or polyorganosiloxanes are ordinarily prepared in a partially polymerized form by the hydrolysis of organosilanes which contain at least two hydrolyzable substituents on their silicon atoms, such as hydrogen, halogens, amino groups, and alkoxy, aroxy and acycloxy radicals, the remaining valences of the silicon atoms being satisfied by organic radicals joined to the silicon atoms through carbon atoms. The actual or theoretical intermediate products of hydrolysis are organosilanediols, organosilanetriols and, in some cases, small amounts of orthosilicic acid, which products condense to form the partially polymerized silicones.

These partially polymerized products are subsequently more fully condensed to their final form by heating them to an elevated temperature such as about 100° C. to 300° C. When used as coating compositions, for instance, the partially polymerized silicones are ordinarily dissolved in a volatile inert solvent, applied as a coating and then heated to vaporize the solvent and cure the silicone to an infusible, insoluble state.

As in the curing of any resinous material, it is desirable that the curing of the silicones upon heating take place as rapidly as possible. In the continuous coating of electrical wire, the relatively slow curing of the silicones as compared to other wire enamels renders the use of existing wire coating equipment difficult and results in uneconomical wire coating speeds. According to the present invention, it has been found that compounds of lead and cobalt act as catalysts to accelerate the curing of the silicones to a substantial degree. Lead compounds are the more effective catalysts and their use in silicone coating compositions permits the enameling of wire with silicones in existing wire coating equipment at normal wire speeds. Cobalt compounds although not as effective as lead, cause a substantial increase in the curing rate of the silicones. Advantageous results can be obtained by using a catalyst containing both lead and cobalt compounds.

Any compound of lead or cobalt, organic or inorganic may be used. Typical compounds effective to accelerate the cure of silicones are the oxides, naphthenates, carbonates, borates and resinates of lead and cobalt.

In the curing of the silicones, substantially the maximum effectiveness is achieved when the lead or cobalt is present in an amount of about .15 per cent by weight of the metal based on the weight of the silicone. Obviously larger amounts of catalysts up to .25 per cent or .5 per cent or more may be used if desired. The upper limit is set only by economic factors or by other undesirable effects introduced by the presence of an excessive amount of the lead or cobalt substance. Although there is no sharp lower limit to the amount of catalyst which will produce an acceleration of cure, it is ordinarily desirable that the weight of metal present in free or combined form be at least about .03 per cent of the weight of the silicone.

The following specific examples are illustrative of the catalytic action of lead and cobalt in accelerating the further condensation of partially polymerized silicones:

Example 1

An ethyl silicone was prepared by reacting .341 mol of ethyl magnesium bromide with .176 mol of silicon tetrachloride in ether solution at about 0° C. A vigorous reaction resulted. The resulting ethyl chlorosilane was hydrolyzed, washed and evaporated free of ether. The ether-free product was condensed to a viscous resin and was dissolved in an aromatic hydrocarbon solvent to form a varnish. The resulting silicone was found to contain about 1.14 ethyl groups per silicon atom. To a portion of the silicone solution was added .14 per cent lead in the form of lead naphthenate. Films of the silicone solution containing lead and of the silicone solution containing no catalyst were flowed out on aluminum test panels and baked at 150° C. After baking for fifteen minutes, the film containing lead was hard and dry, whereas the film containing no catalyst was still soft and sticky.

Example 2

A methyl phenyl silicone was prepared by the procedure described in Example 1 using .369 mol of methyl magnesium bromide, .197 mol of phenyl magnesium bromide and .30 mol of silicon tetrachloride. The resulting silicone was found to contain about 1.55 total methyl and phenyl substituents per silicon atom and about 3.6 methyl substituents per phenyl substituent. The silicone was dissolved in an aromatic hydrocarbon solvent to form a varnish as in Example 1. The methyl phenyl silicone varnish containing no catalyst as well as with similar varnishes containing respectively .14 per cent of lead and .14 per cent of cobalt based on the weight of the silicone in the form of lead and cobalt naphthenates were flowed out on aluminum test panels. These panels were baked at 150° C. After fifteen minutes the silicone film containing lead had dried hard. After forty-five minutes the silicone film containing cobalt had dried hard. The film containing no catalyst remained tacky after baking for two hours.

*Example 3*

Aluminum test panels were coated with Dow Corning silicone varnish 990A (a silicone varnish believed to be a solution of an alkyl aryl silicone in aromatic hydrocarbon solvent) containing no catalyst and with the same varnish containing, in respective specimens, 1.4 per cent lead as lead oxide and 4.3 per cent lead as lead oxide. These panels were baked at 250° C. After fifteen minutes the films containing lead had dried hard. The films containing no catalyst did not dry hard until about one hour.

*Example 4*

Aluminum test panels were coated with Dow Corning silicone varnish 993 (a silicone varnish believed to be an alkyl aryl silicone in aromatic hydrocarbon solvent) containing no catalyst and with the same varnish containing, in respective specimens, .03 per cent lead as lead naphthenate and .14 per cent cobalt as cobalt naphthenate. Upon baking at 250° C., the films containing lead and the films containing cobalt had dried hard in fifteen minutes, whereas the films containing no catalyst did not dry hard until about three hours. The addition of 3 per cent of lead carbonate, 3 per cent of lead borate and 2.5 per cent of lead resinate based on the total weight of the varnish also produced films capable of drying hard upon heating for fifteen minutes at 250° C.

*Example 5*

Two wire coating enamels were prepared having the following composition:

| | Composition 1 | Composition 2 |
|---|---|---|
| | Parts by Weight | Parts by Weight |
| Dow Corning varnish 993 | 140 | 140 |
| Solvesso #3 | 87.7 | 87.7 |
| Lead Nuodex solution (Solution of lead naphthenate, in petroleum spirits, containing 24 per cent lead calculated as metal) | | 0.54 |

Respective lengths of No. 31 AWG cadmium plated copper wire were coated with each of these enamels in a conventional wire enameling machine using an oven temperature of 400° C. and, with each enamel, two wire speeds, one of 15 feet per minute and the other of 25 feet per minute. When coating composition No. 1 was used, the enamel was underbaked at both wire coating speeds and could be easily scraped off with the fingernail. With composition No. 2 a satisfactorily baked coating which was hard and tough was obtained at both speeds.

Lead and cobalt catalysts are effective in accelerating the condensation of any polyorganosiloxane, particularly those in which the organic substituents on the silicon atoms are alkyl, aryl or aralkyl radicals and in which these substituents are present in amounts greater than one but less than two per silicon atom. In so far as acceleration of cure with lead and cobalt is concerned, the present invention relates only to silicone compositions containing no non-benzenoid carbon-to-carbon unsaturation and to methods of curing such compositions and is not intended to include compositions or curing methods in which ingredients containing non-benzenoid carbon-to-carbon unsaturation, such as drying oils, are present or to include compositions or methods involving silicones having organic substituents containing non-benzenoid carbon-to-carbon unsaturation.

When curing catalysts, and particularly lead, are added to compositions containing partially polymerized silicones, the stability of the compositions upon storage, even at room temperatures, is considerably reduced. Silicones stored for long periods of time under these conditions eventually polymerize to a point beyond usability. It has been found that the stability of these compositions is restored by the addition of a small amount of a catechol. Pyrocatechol and p-tertiary butyl catechol have been found particularly effective, but any substituted pyrocatechol having aliphatic hydrocarbon substituents may be employed, particularly substituents containing up to six carbon atoms and more particularly alkyl substituents.

The catechols also effectively retard the polymerization of silicone varnishes upon storage which tends to take place even in the absence of curing catalysts. This tendency to polymerize upon storage in the absence of curing catalysts is particularly noticeable in varnishes in which the silicones are present in high concentrations, such as more than 50 per cent by weight. The stability of these concentrated silicone varnishes is considerably improved by the addition of a catechol.

The catechol stabilizers have been found effective in amounts as little as .03 per cent based on the weight of the solid silicone resin. Ordinarily, however, larger amounts such as about .2 per cent are more satisfactory. Larger amounts up to 1 per cent or 2 per cent or more may be used if desired.

The stabilization achieved with catechols at storage temperatures does not retard the rate of cure of the silicones at curing temperatures. The following specific example illustrates the stabilizing action of the catechol.

*Example 6*

A silicone varnish was prepared by dissolving 43.6 parts by weight of the methyl phenyl silicone described in Example 2 in 55.1 parts of toluene and by adding 1.22 parts by weight of lead Nuodex solution containing 5 per cent lead. Upon storage for eight days at room temperature, this silicone varnish had gelled. A similar varnish to which was added .0852 part by weight of pyrocatechol remained fluid after twenty-seven days of storage at room temperature. The catechol did not retard the curing rate of the varnish as shown by the fact that a film of the varnish containing catechol dried hard in fifteen minutes baking at 150° C.

Although the invention has been described in terms of its specific embodiments, certain modifications and equivalents will be apparent to those skilled in the art and are intended to be included within the scope of the present invention which is to be limited only by the reasonable scope of the appended claims.

What is claimed is:

1. A composition comprising a heat-curable polyorganosiloxane, a substance selected from the group consisting of lead compound curing catalysts and cobalt compound curing catalysts, and a catechol as a stabilizer against setting during storage, said catechol being selected from the group consisting of pyrocatechol and substituted pyrocatechols the substituents of which are aliphatic hydrocarbon radicals, the organo substituents on the silicon atoms of said polyorganosiloxane being hydrocarbon substituents and the number of said hydrocarbon substituents per silicon atom being more than one but less than two.

2. A composition as described in claim 1 wherein the catechol is a substituted pyrocatechol, the substituents of which are aliphatic hydrocarbon radicals.

3. A composition as described in claim 1 wherein the catechol is pyrocatechol.

4. A composition as described in claim 1 wherein the catechol is p-tertiary butyl catechol.

5. A composition comprising a heat-curable polyorganosiloxane, lead naphthenate as a curing catalyst, and pyrocatechol as a stabilizer against setting during storage, the organo substituents on the silicon atoms of said polyorganosiloxane being hydrocarbon substituents, and the number of said hydrocarbon substituents per silicon atom being more than one but less than two.

JOHN B. DE COSTE.

REFERENCES CITED

The following references are of record in the file of this patent:

UNITED STATES PATENTS

| Number | Name | Date |
| --- | --- | --- |
| 2,386,259 | Norton | Oct. 9, 1945 |
| 2,389,804 | McGregor | Nov. 27, 1945 |
| 2,410,737 | Jenny | Nov. 5, 1946 |
| 2,449,572 | Welsh | Sept. 21, 1948 |

FOREIGN PATENTS

| Number | Country | Date |
| --- | --- | --- |
| 358,472 | Great Britain | Oct. 5, 1931 |

OTHER REFERENCES

Scientific Section, National Paint, Varnish and Lacquer Assoc. Circular 705, May 1945, pp. 412 to 419.